Jan. 12, 1954          E. L. HOFFMANN ET AL          2,665,917
                      PHONOGRAPH RECORD CHANGER

Filed Feb. 13, 1946                            10 Sheets-Sheet 1

INVENTORS
ELMER L. HOFFMANN
RICHARD A. NELSON
BY
J. D. Douglas
ATTY.

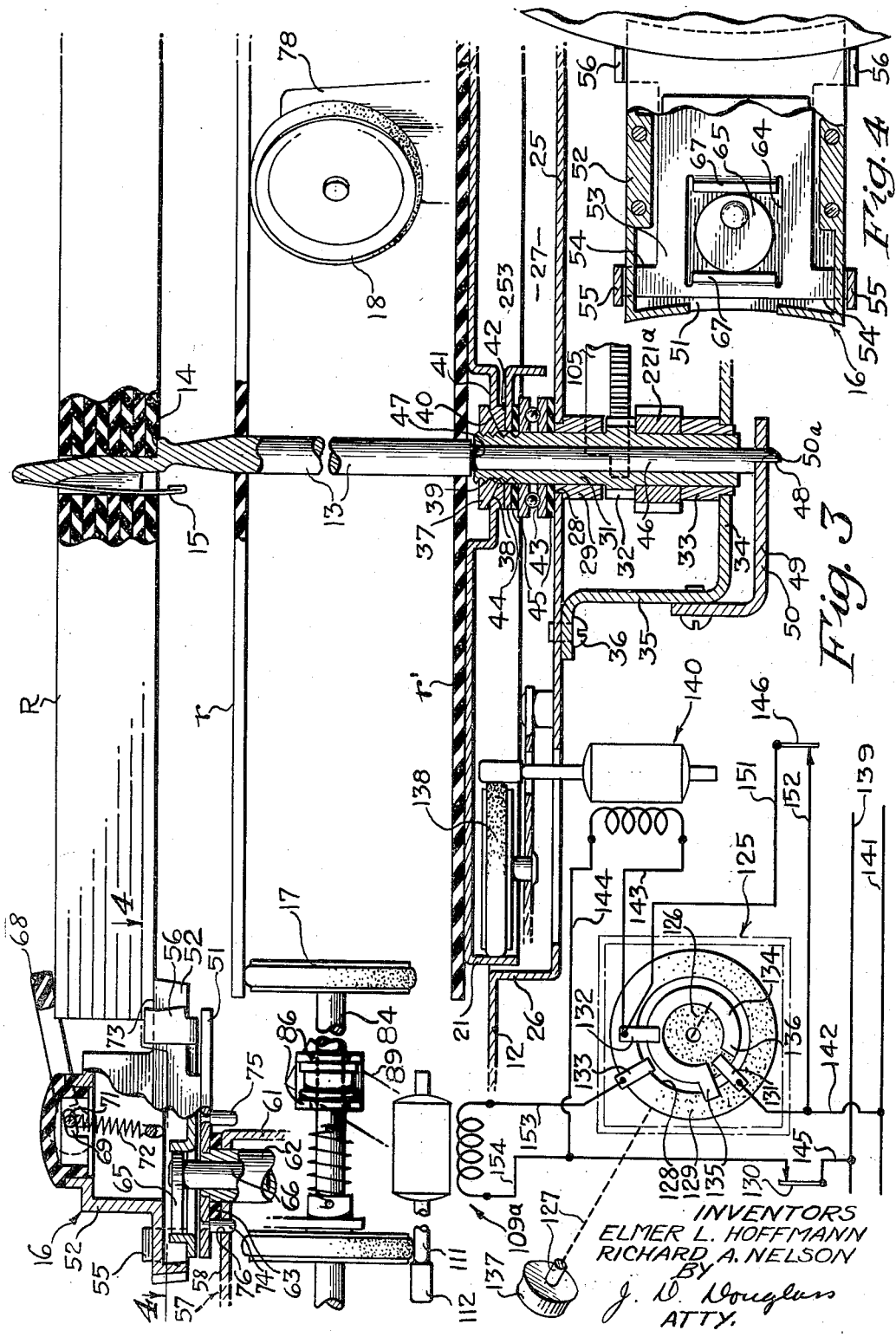

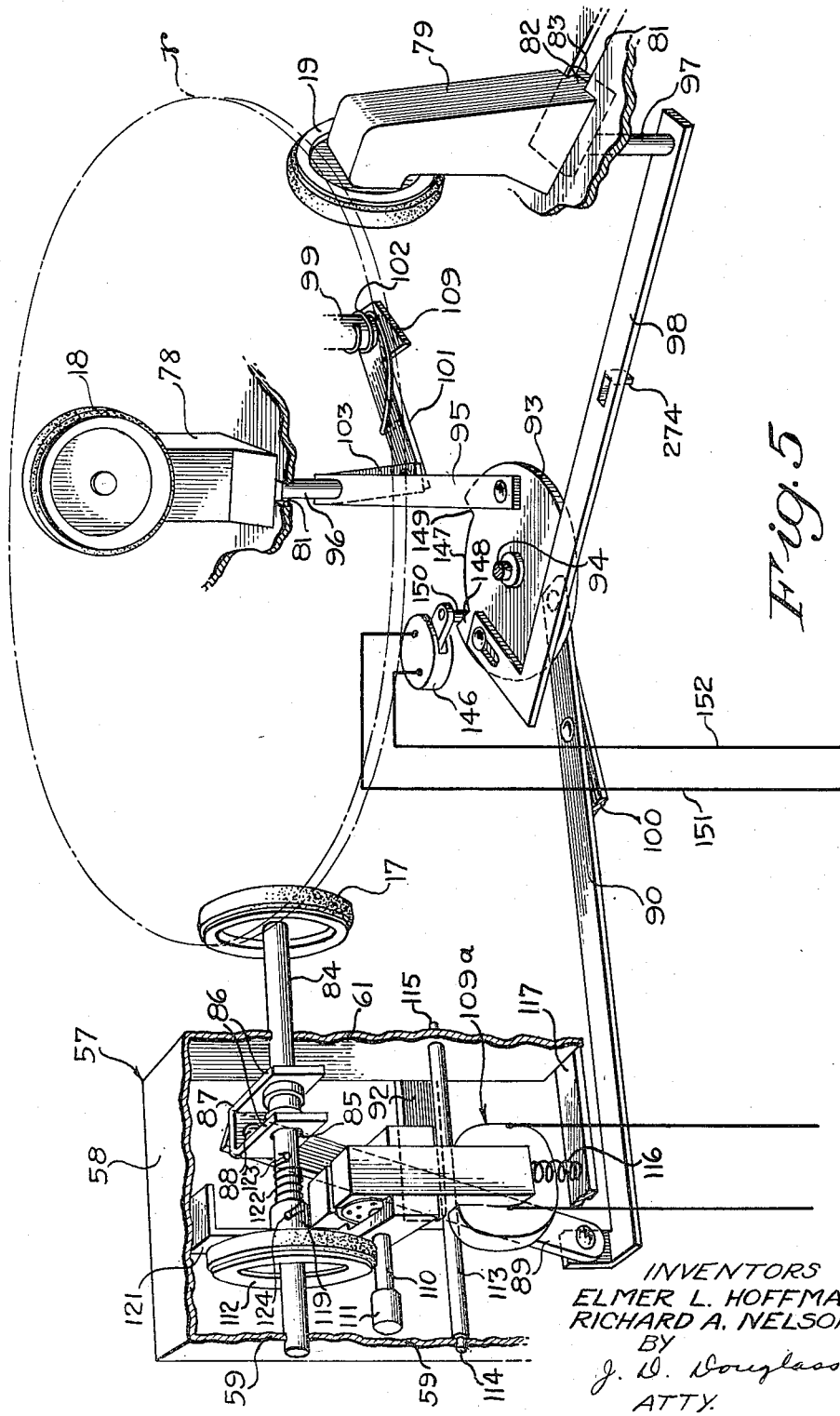

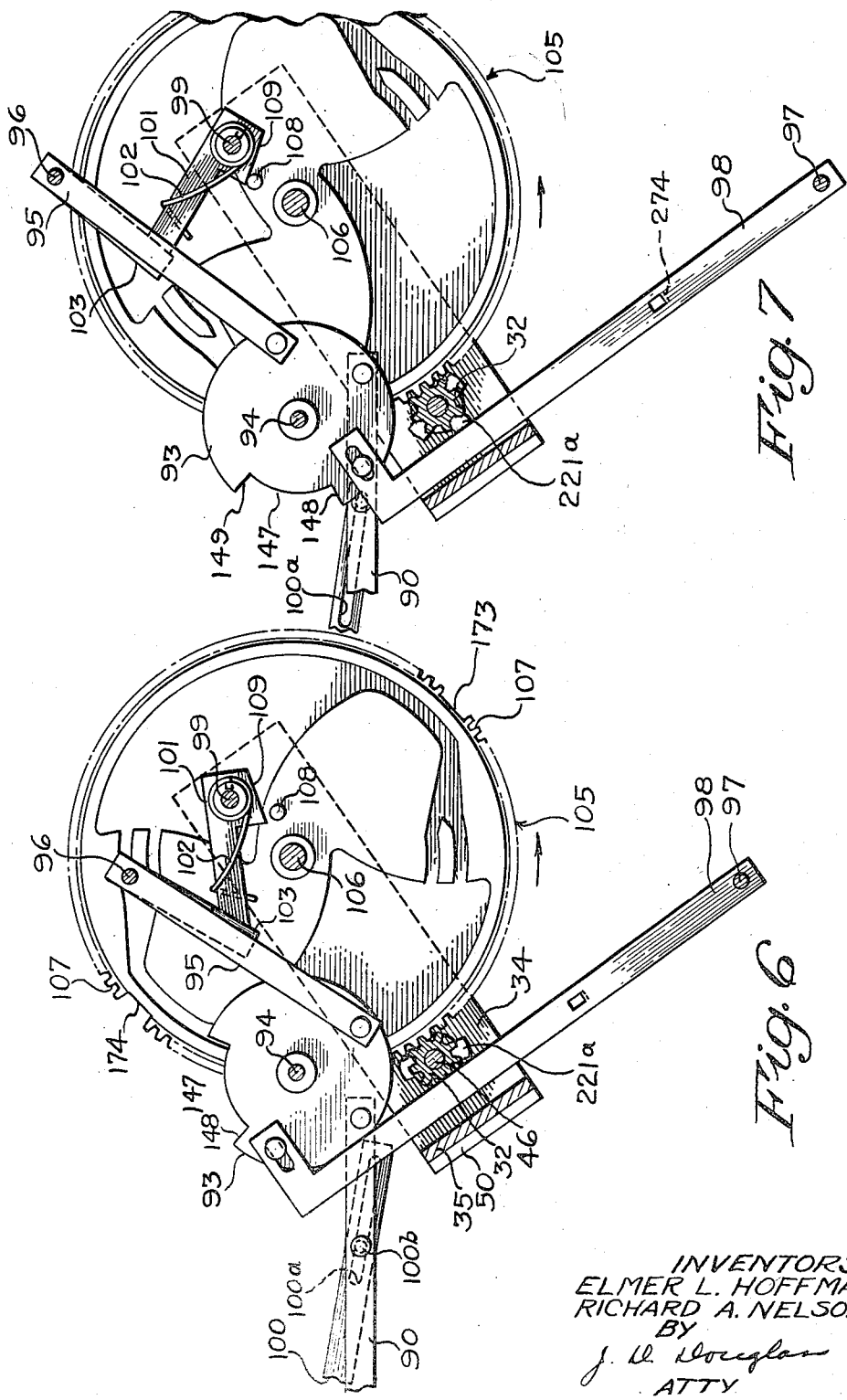

Jan. 12, 1954  E. L. HOFFMANN ET AL  2,665,917
PHONOGRAPH RECORD CHANGER
Filed Feb. 13, 1946  10 Sheets-Sheet 5

INVENTORS
ELMER L. HOFFMANN
RICHARD A. NELSON
BY
J. O. Douglass
ATTY.

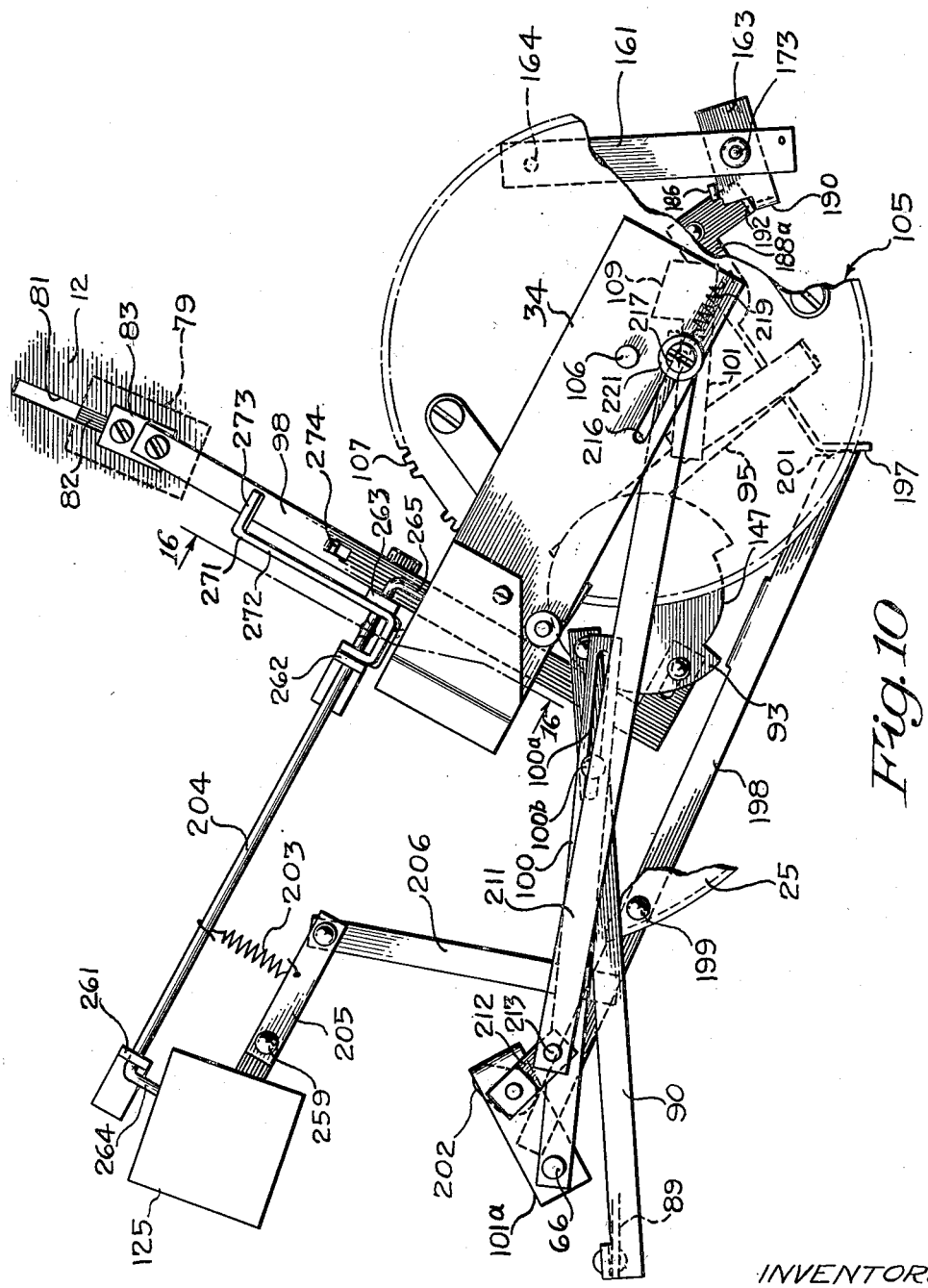

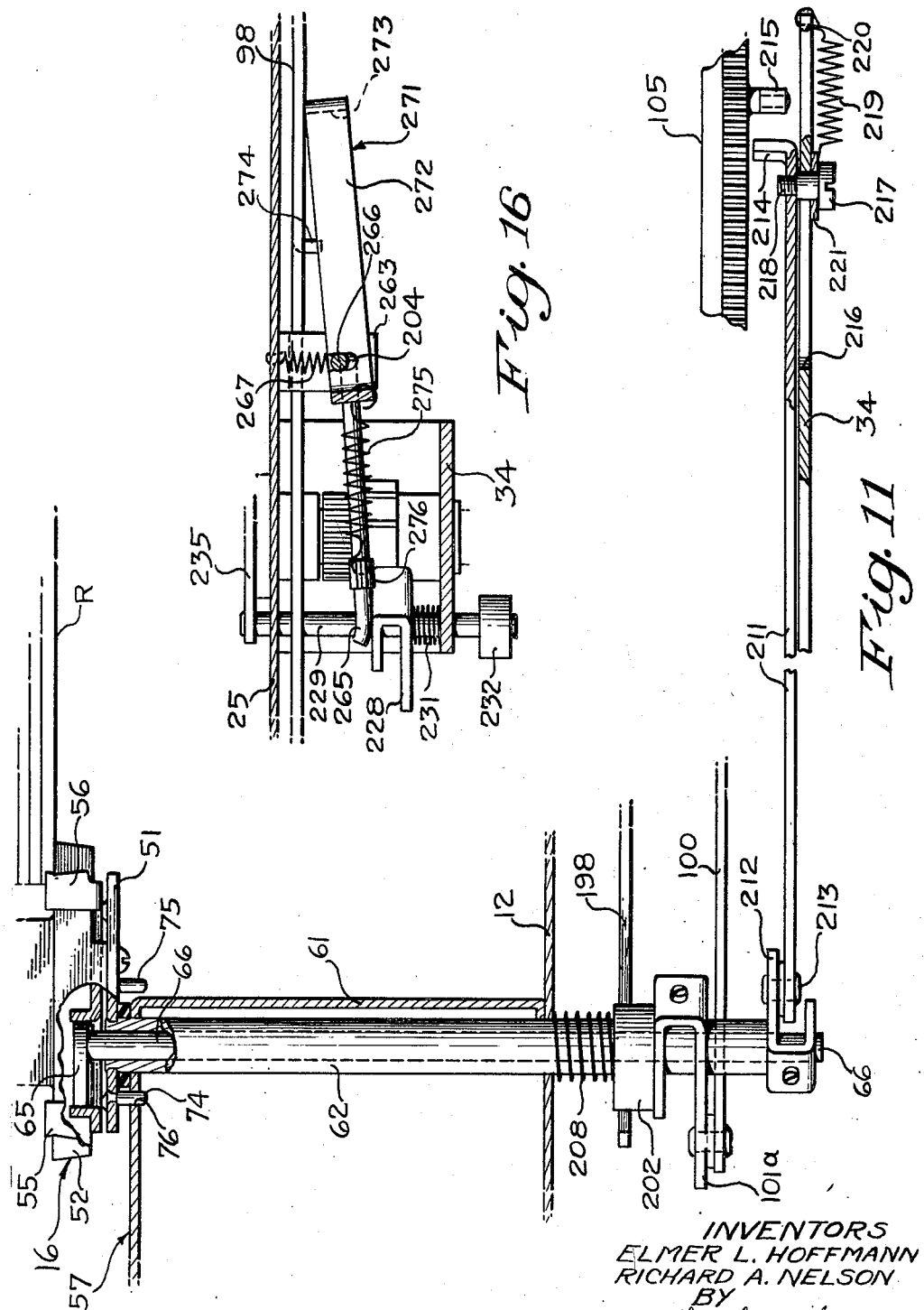

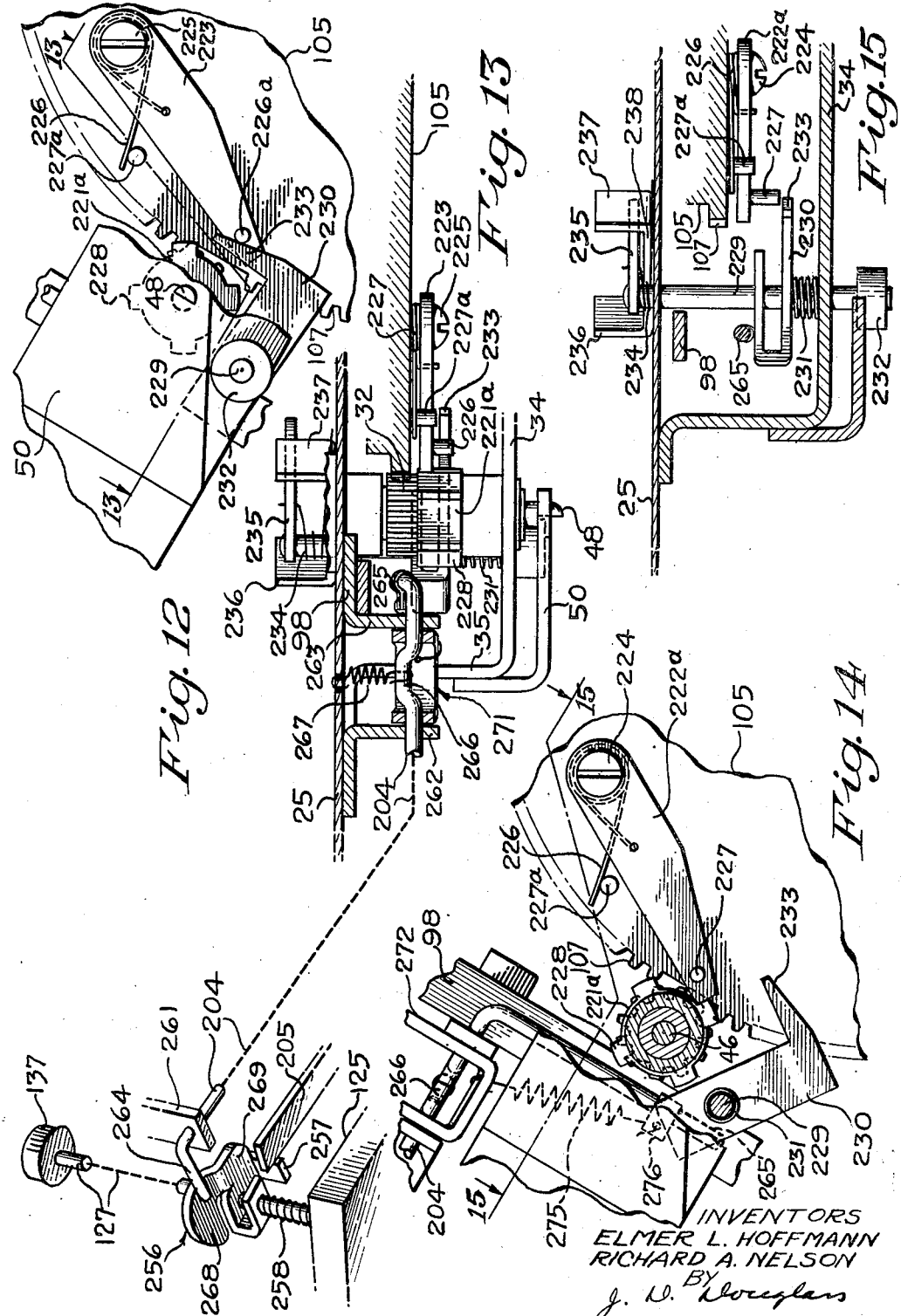

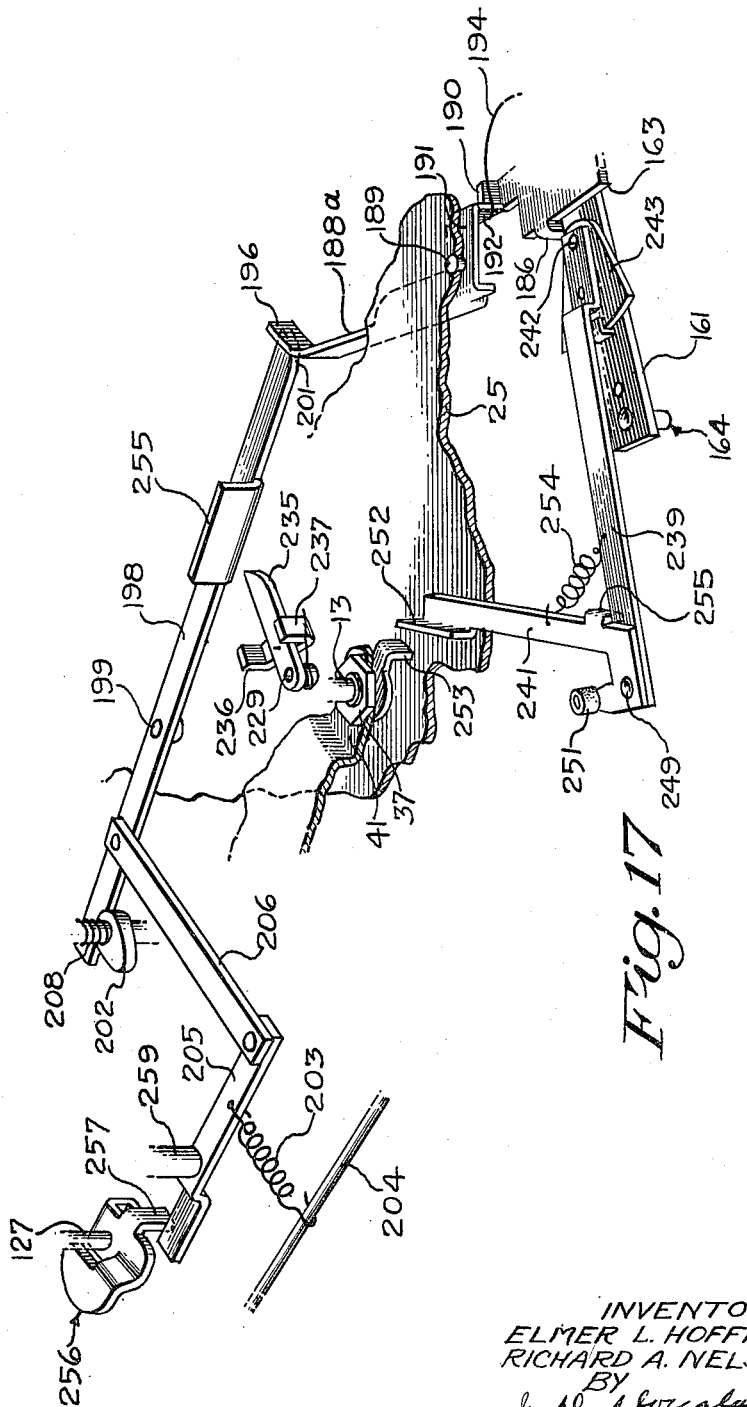

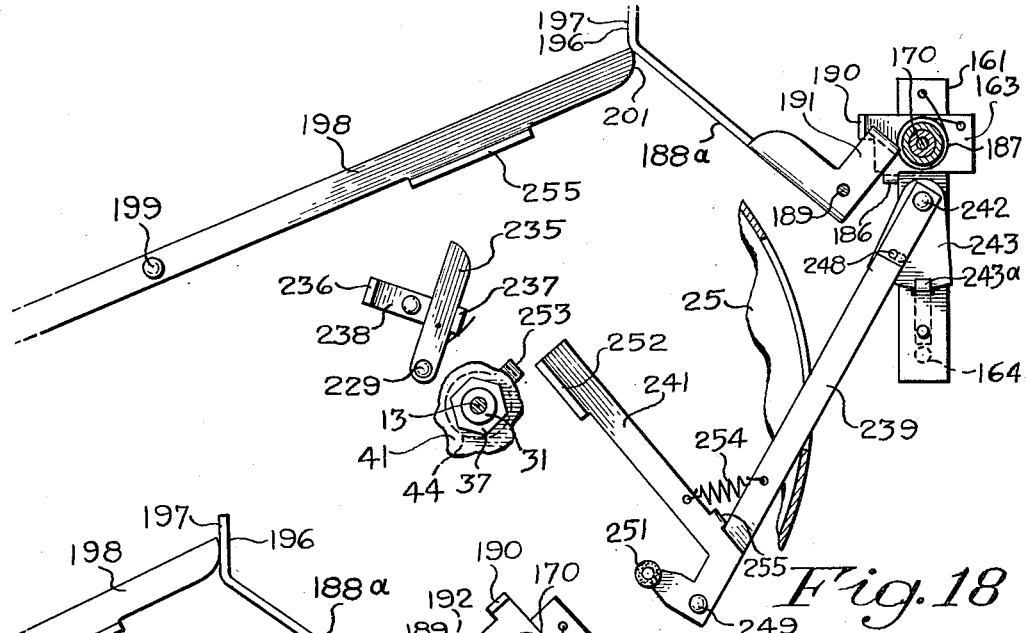
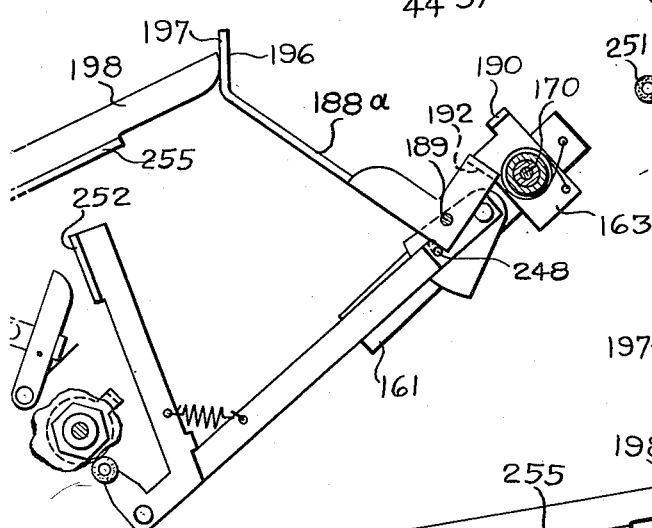
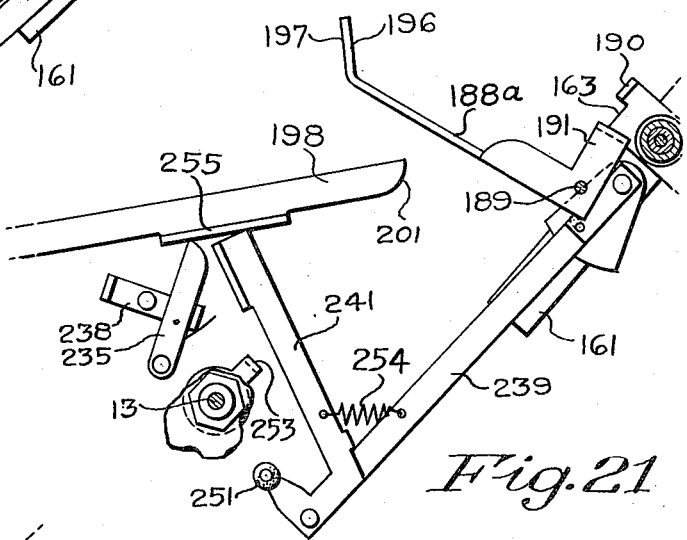
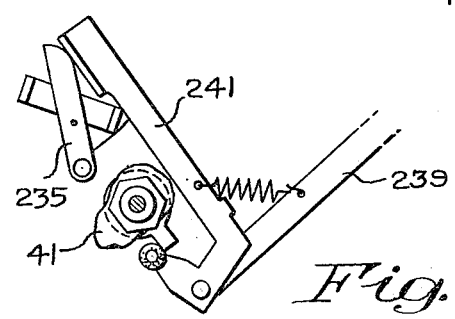

Patented Jan. 12, 1954

2,665,917

UNITED STATES PATENT OFFICE 2,665,917

PHONOGRAPH RECORD CHANGER

Elmer L. Hoffmann, Park Ridge, and Richard A. Nelson, Chicago, Ill., assignors to Admiral Corporation, Chicago, Ill., a corporation of Delaware Application February 13, 1946, Serial No. 647,342

9 Claims. (Cl. 274—10)

This invention relates to record players and more particularly to a record changer of the so-called automatic type wherein both sides of a record are played, without the necessity of turning the record over.

A limitation to record players as commonly constructed is that they are lacking in capacity to play more than one side of any one of the records among a group of records before all the records of the group have been played on one side. By this manner of reproduction the continuity of the subject matter on opposite sides of a record may be broken since what occurs on one side of a record is often supplementary to or a continuation of what occurs on the reverse side. Record changers which are adapted to consecutively play both sides of a record, although known, have heretofore been so expensive of construction that there is little demand for them in the average home.

Owing to the present invention, a record player has been produced which is less expensive of manufacture due to its simplicity of construction, than previously made devices which were adapted to play both sides of a record. This is due to a novel construction in which a tone arm is made that bears a needle having two record-engaging points. The upper side of the pickup arm first has playing engagement with the lower side of a record in an upper station and then, having been automatically transferred to a second station the lower side of the pickup mechanism completes playing of the record by engaging the upper surface thereof. Additionally, the pickup arm is caused to move automatically from a position of rest, beside the playing stations, to its several positions between the stations and then to return to its position of rest beside the stations. Thereupon a record is transferred from the upper playing station to the lower playing station and played, then another record from the stack is transferred to the upper playing station to replace the one which has been played in both stations. Although a conventional turntable is employed to support the records in the lower station, where they accumulate, a series of axially movable supports is employed to support a record in the upper station in a horizontal plane substantially above the level of the pickup arm and to rotate the record in a direction opposite to the direction that the turntable is rotated. The supports are also caused to automatically move outward thus permitting passage of a record to the lower station after which the supports are returned to afford support for the next record.

More specifically the invention contemplates a machine which includes means for supporting records in two playing stations; one which includes a drivable turntable for supporting a record in a lower station, and one which includes a series of rotary members to support a record in another playing station, directly above the first, by engaging it toward its periphery. A vertical spindle, extending upwardly through the vertical axis of the playing stations, has a shoulder toward the upward extremity of the spindle which is in part adapted to support a stack of unplayed records adjacent their center holes. The stack is additionally supported at the side thereof by means which includes an ejecting mechanism for engaging the record that is at the bottom of the stack for moving it off the shoulder of the spindle so that the record is dropped to the upper playing station, the operation being carried out without dislodging more than one record at a time from the stack. Additionally, pickup means are adapted to operate automatically, and in effective sequence, between the playing stations so that after one side of the record has been played its supports are withdrawn only long enough for the record to drop to the turntable where the remaining side of the record is played; thereupon another record is removed from the stack and transferred to the upper playing station.

The invention further comprehends use of pickup means comprising a tone arm having a dual-point needle or stylus extending above and below the tone arm so that as the units comprising a stack of records are fed, one by one, to the playing stations, there is no occasion to invert the records in order to obtain consecutive playing of the respective sides of each.

In the drawings:

Fig. 3 is a diagrammatic view showing certain elements of the mechanism, partly in section and partly in elevation;

Fig. 4 is a horizontal section taken on line 4—4 of Fig. 3, showing elements of the ejector mechanism;

Fig. 5 is a fragmentary diagrammatic view of elements of the record supporting and rotating mechanism, in perspective;

Fig. 6 is a fragmentary bottom plan view, partly in section, showing the cam and its associated crank member and parts related thereto;

Fig. 7 is a view of the parts indicated in Fig. 6, but in a different position;

Fig. 10 is a bottom plan view of linkage governing operation of the record changer including the cam wheel which is broken away to reveal underlying parts;

Fig. 11 is a fragmentary view, partly in section and partly in elevation, showing the mechanism for operating the ejector head;

Fig. 12 is a fragmentary bottom plan view indicating the lugged wheel and dog mechanism employed to restore motion to the cam wheel and govern continuance of rotation of the cam wheel;

Fig. 13 is a fragmentary sectional view showing the lugged wheel and dog mechanism at the right thereof and control means therefor at the left of the view, the left of the view being in perspective and is viewed from above the eye while the portion of the view at the right being in vertical section and taken on line 13—13 of Fig. 12;

Fig. 14 is a fragmentary view of the parts shown in Fig. 12, one of the dogs being in engagement with the lugged wheel;

Fig. 15 is a section taken on line 15—15 of Fig. 14;

Fig. 16 is a view, in section, taken on line 16—16 of Fig. 10;

Fig. 17 is a diagrammatic view, in perspective, showing parts employed to govern rotation of the cam wheel;

Fig. 18 is a diagrammatic top plan view of parts indicated in Fig. 17;

Fig. 19 is a view of the parts shown in Fig. 18, the parts being in a different position to govern operation of the cam wheel;

Fig. 20 is a view of some of the mechanism shown in Fig. 18, the mechanism being shown in a phase of the operation of releasing one of the dogs;

Fig. 21 is a view of the parts indicated in Fig. 18 and indicating the position occupied by the parts when they prevent further operation of the cam wheel after a record has been played.

Figure 1:
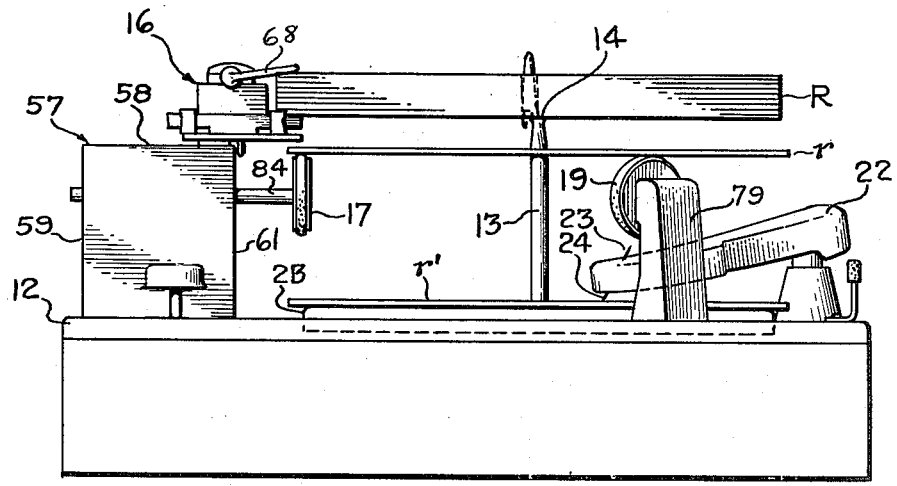
Fig. 1 is a view, in front elevation, showing an automatic record player, embodying the present invention.

In the drawing, wherein for the purpose of illustration, is shown one embodiment of the invention, the reference character R (Fig. 1) is used to denote a group of records stacked one on top of the other and spaced in elevated relationship to a base or housing 12. Centrally thereof the records are engaged by a spindle 13 having a shoulder 14, to support the records at their center holes. The spindle also includes a spring 15 (Fig. 3) normally tending to urge the records to the left to maintain their positions on the shoulder 14. At their peripheries the records are supported on an ejector head indicated in its entirety by the character 16, and described in detail hereinafter. When the machine starts running, a record from the bottom of the group, R is pushed to the right by the ejector mechanism 16 against the resistance of the spring 15 until the shoulder 14 no longer affords support for the record and it drops to an upper station where the lower side of the record is played. In station $r$ the record is supported by a series of rotary wheels including a driver pulley 17 and idlers 18 and 19. All the pulleys 17, 18 and 19 are movable radially of the spindle 13. This is to provide extended or supporting positions and a retracted or record releasing position. In the extended positions, the pulleys are adapted to operatively support records of different sizes in the upper playing station $r$. By providing support for the records, adjacent their edges, bending of the same and consequent vibration of the records are avoided. On withdrawal to their retracted positions, the pulleys release a record from the upper playing station and allow it to drop to the lower playing station $r'$. Then the pulleys are advanced to one of their extended positions. The position to which the pulleys are advanced, besides their motion to and from these several positions, is governed by the mechanism.

In the station $r'$ the remaining side of the record is played. Support for the record in station $r'$ is provided by a conventional turntable 21 which rotates the record in a direction opposite to the direction of rotation provided the record in the upper station. After both sides of the record have been played, an unplayed record is removed from the bottom of the pile R by the ejector mechanism 16 and caused to drop to the station $r'$. Another factor incident to the novel method of playing both sides of a record without inverting it is the construction of a pickup arm 22. The pickup arm carries styli or needles 23 and 24 extending upwardly from and/or downwardly from the free extremity of the arm. Preferably the needle 24 is integral with the needle 23, the same extending through the pickup arm. In playing both sides of a record the pickup arm first establishes playing engagement between the needle 23 and the lower side of the record in the station $r$. After playing this side of the record, the arm moves downwardly, thence outwardly to a position beside the playing stations where it comes to rest. It is while in this position that the pulleys 17, 18 and 19 are withdrawn from beneath the record in station $r$ allowing the record to drop to station $r'$. The pickup arm then provides playing engagement between the needle 24 and the remaining unplayed upper surface of the record in station $r'$. After this side has been played, the arm rises slightly, and is then swung outward where it comes to rest beside the playing stations, and where it remains until the next record is played. This completes a cycle of operation of the pickup arm in which the movements are produced automatically and in effective sequence by mechanism later to be described. In the foregoing manner both sides of a record are therefore played consecutively before another record is played, and the playing cycle is repeated until all the units of the group R have accumulated in the station $r'$.

Coordination of these operations and the reasons for their sequence may be apparent on reference to Fig. 3. Herein the character 12 denotes a frame or housing having a depressed horizontal portion 25 thereof. The portion 25, together with sidewall portions 26, thus provide a recess 27, to accommodate the turntable 21. The horizontal portion 25 is provided with an aperture 28 in which a suitable bushing 29 is rigidly fitted to afford bearing support for a sleeve 31. A portion of the sleeve which is of enlarged diameter is toothed to provide a pinion 32. The sleeve 31 is additionally journaled in a bushing 33, mounted in a lower arm 34, the arm being an integral part of a bracket 35, attached to the portion 25 by screws 36. Upwardly thereof the sleeve 31 is threaded in a nut 37 having a lower surface 38, of cone-shaped contour. The center of the turntable is provided with a hole 39 through which passes the sleeve 31. In the vicinity of the hole 39, the turntable is distended as at 41 sufficiently to accommodate the nut at a level below the top of the turntable. Additionally, the turntable is provided with a boss 42, while upwardly thereof the hole 39 is counterbored to provide a conical surface 40, complementary to the cone-shaped surface of the nut. Owing to this construction, the axis of the turntable is drawn into alignment with the axis of the shaft 31, while a ball bearing 43, metal washer 44 and fibrous washers 45 space the table 23 from the base 25 and resist downward thrust of the turntable. The fibrous washers 45 also act as vibration insulating agents for the turntable.

The record spindle 13 restrains the records from lateral displacement. In order to do so, the spindle is mounted in the sleeve 31 although the sleeve is capacitated to turn about the spindle. That this may be effected, a section 46 of the spindle is of reduced cross-section, thus providing a shoulder 47 above the end of the sleeve while the section 46 extends downwardly through the sleeve and terminates in a semi-cylindrical section 48, the shoulder of which rests on a sub-bracket 49. The sub-bracket 49, conveniently attached to the bracket 35, includes a horizontal arm 50 in which a semi-circular hole 50a is disposed, complementary to the extremity of the cylindrical section 48. By engagement of the section 48 with the hole 50a, the spindle is locked against turning moment.

The spindle 13 is cooperatively associated with the ejector head 16, previously described in Letters Patent No. 2,352,331. Briefly, however, the head includes a rectangular support plate 51 (Figs. 3 and 4) to which is rigidly clamped a housing 52 embracing, with the support plate, a slide 53 having laterally extending arms 54, terminating in upwardly extending record engaging fingers 55 and 56. The support plate 51 is mounted above a subhousing 57 having a top wall 58 and end walls 59 and 61, respectively. The plate 51 is rigidly mounted eccentrically thereof on a sleeve 62 which is journaled in the wall 58, said wall and plate being spaced from each other preferably by a fibrous washer 63. The slide 53 is provided with a rectangular aperture 64 in which is disposed a cam 65 that is rigidly mounted on a shaft 66, journaled within the sleeve 62. At opposite sides of the aperture 64, ears 67, preferably struck from the slide, extend upwardly on either side of and in intimate association with the cam 65, so that rotation of said cam produces longitudinal movement of the slide and fingers 55 and 56. Rotation of the cam 65 thus advancing the slide from the extreme left is accompanied by engagement of the fingers 56 with the lowest record in station R, and to displace the record bodily to the right against the resistance of spring _ on the spindle until the shoulder 14 no longer affords support for the record, it drops to the station r in which it is supported on the rotary members 17, 18 and 19 and where it is in readiness for playing on the lower side thereof.

Means is provided to hold the records against accidental displacement and comprises a yoke 68 rigidly mounted on a rack shaft 69, having a central crank section 71 to which biasing force of a tension spring 72 is applied urging the yoke to assume a position on either side of the shaft; and, as in the Fig. 3 position, to press downwardly against the stack of records resting on a table surface 73 of the housing 52.

The ejector head 16 is adapted to occupy two positions so that it may effectively engage 10-inch and 12-inch records. In the position indicated (Fig. 3) the head 16 is adjusted to handle a 10-inch record. On turning the head through a half turn, however, the head is in readiness for operative engagement with 12-inch records. In order that the head may be locked in either of these positions, pins 74 and 75 are conveniently mounted on the support plate 51. The pins extend downward from an arc about the axis of sleeve 62, and are adapted to severally enter a hole 76 in the wall 58 of the housing 57. In shifting the head 16 from the 10-inch to the 12-inch size record adjustment, said head is grasped, lifted upwardly against spring pressure, later to be referred to, until the pin 74 clears the hole 76. Then the head is rotated until the pin 75 is above hole 76 when the head is allowed to assume the other of the two positions.

As previously stated, the pulleys 17, 18 and 19 are movable from an inwardly extended position, in which they afford support for a record, to an outwardly retracted position from beneath the periphery of the record so that the record may drop to the station r'. From this position the pulleys are simultaneously returned to their inward extended position. The reason for this motion may best be understood on referring to Fig. 5 wherein it will be noted that the idlers 18 and 19 are supported on horizontal shafts journaled in the upper ends of bearer member of pedestals 78 and 79. The pedestals are mounted on the horizontal surface of the base and each is provided with a pad 82 at its lower extremity which is dovetailed in a slot 81. Below the slot is a retainer plate 83 which is secured to the pads to prevent upward displacement of the same.

The driver wheel 17 is mounted on a horizontal shaft 84 that passes through walls 59 and 61 of the housing 57 in which it is slidably journaled. The shaft also passes through vertical slots 85 in arms 86 of a yoke 87. Centrally of the yoke the same is pivoted at 88 to the end of a lever 89, adapted to fulcrum about an axis passing through the end of an arm 92, on the walls 61 of the housing 57. Rocking of the lever 89 therefore advances or retracts the pulley 17 at the same time permitting ready rotation of the pulley.

Positive coupling means between the pulleys 17, 18 and 19 are provided so that when one pulley is axially moved, the remaining two pulleys are simultaneously advanced or retracted a like amount. This includes a rotary plate or crank member 93, journaled on a stud 94 which is, in turn, rigidly fastened to the horizontal casing wall 25. The lever 89 is coupled to the crank member 93 by a link 90; the pedestal 78 is coupled to the crank member by a link 95 and rod 96; the rod extending downwardly from the pedestal. Another rod 97 on the pedestal 79, together with a link 98, couples the pedestal to the crank member. Rigidly mounted on the base 12, from which it extends downwardly, is a post 99. To the lower extremity of the post is pivoted a cam bar 101, urged in counter-clockwise direction about its support by a spring 102. Since the spring is coiled about the post 99 and has its two ends anchored respectively to the post and the movable cam bar 101, the tendency of the spring to uncoil may be communicated to the crank member. This is effected by a link 103, pivoted to the rod 96 and bar 101. It will therefore be noted that the force of the spring 102 is communicated to the pulleys 17, 18 and 19 so that they are normally held in an inward extended position as indicated in Fig. 5.

Cam means are employed to retract the pulleys 17, 18 and 19 outward against the force of the spring 102. This can best be understood by referring to Figs. 6 and 7 wherein is indicated a combination gear and cam wheel or control wheel identified in its entirety by the character 105. The wheel 105 is journaled on a shaft 106 between the bracket arm 34 and base wall 25. Furthermore, it is provided with gear teeth 107 on its periphery, adapted to intermittently mesh with the pinion 32. On the upper surface thereof the wheel bears a rotary pin 108, adapted to engage with a cam surface 109 on the cam bar 101 to which said cam bears an inclined relationship. It is therefore in accordance with the sequence of operations that as the pin is carried about the shaft 106 it engages the cam surface thus pushing the cam-bar 101 in a clockwise direction about the post 99, against the force of spring 102. In so doing the crank member 93 is rotated from the position shown in Figs. 5 and 6 to the position shown in Fig. 7. The pedestals 78 and 79 being coupled to the crank member 93 are thus moved away from each other so that a record may drop from station $r$ to station $r'$. From the position indicated in Fig. 7, the pedestals 78 and 79 are returned to the position of Fig. 6, by the spring 102 after the pin 108 has been carired past cam 109.

Figure 2:
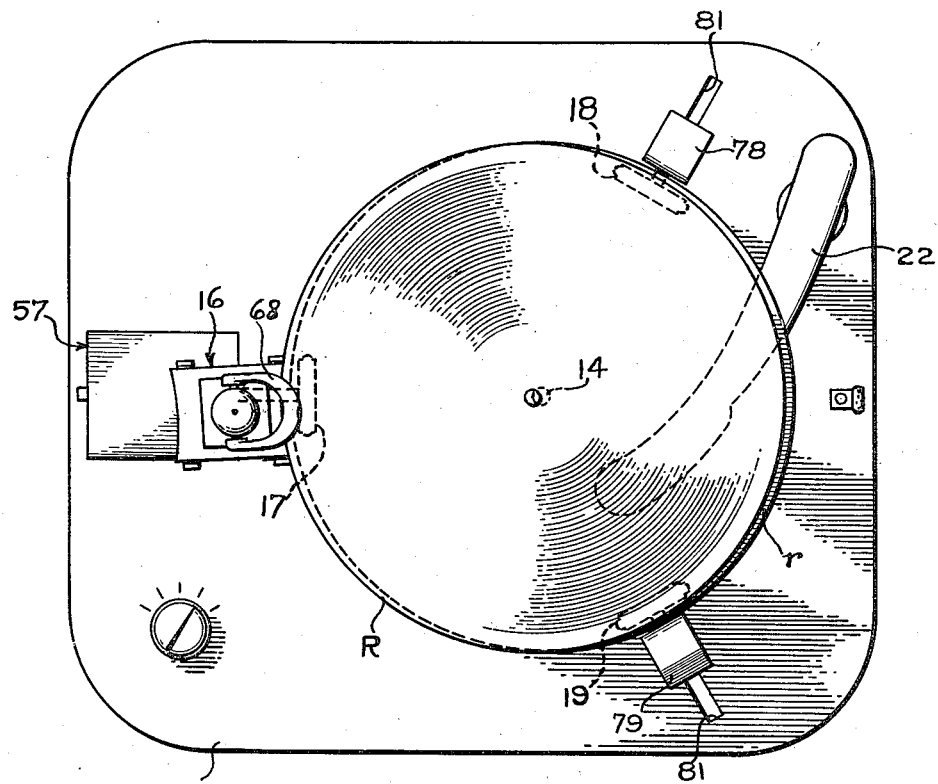
Fig. 2 is a plan view of the record player, indicated in Fig. 1.

Means are provided for limiting the extent to which the spring 102 (Figs. 6 and 7) may move the pulleys 17, 18 and 19 toward each other. This includes a link 100 having a slot 100a, toward the right hand extremity thereof. A pin 100b, carried by the link 90, extends into the slot 100a which the pin slidably engages. Additionally, the link 100 is pinned to a crank-arm 101a (Fig. 11), carried by the sleeve 62. It will therefore be understood that when the ejector head 16 is rotated from a position adapted to support a 10-inch record to a position in which the ejector is adapted to operatively engage a 12-inch record that the pin 100b (Figs. 6 and 7) is moved farther from the crank member 93. While in this position the extent to which the pulleys 17, 18 and 19 can be extended toward each other is limited by contact of the pin 100b with the left end of the slot 100a, after the pin 108 has been carried past the cam 109. When playing 10-inch records, the extent to which the pulleys may move toward each other is limited only by the ends of slots 81 (Figs. 2 and 5).

In order that records of at least two sizes may be effectively played, a motor 109a (Fig. 5) is provided with a shaft having a portion 110 of small diameter and a portion 111 of larger diameter. The motor is so pivoted that the shaft 110 is resiliently biased toward shaft 84. This provides contact between the portion 110 and pulley 112 when playing 10-inch records. But the pulley 112 is slidably keyed to shaft 84 and therefore movable therealong for engagement with the enlarged portion 111 when 12-inch records are played. The motor 109 is pivotally supported at one side thereof on a rock shaft 113. The shaft 113 is provided with end portions 114 and 115, of reduced diameter, which are journaled in the walls 59 and 61. The motor is urged upwardly about the shaft 113 by a compression spring 116, mounted beneath the motor on any convenient support. In the present embodiment the support comprises a strap 117 supported between the lower extremities of the walls 59 and 61.

In playing a 10-inch record, the pulley 112, as previously indicated, rests against the shaft 110 from which the pulley derives rotation by frictional engagement. When a 12-inch record is to be played, the pulley 112 is displaced laterally to the left of the position indicated (Fig. 5) so that it becomes drivingly associated with portion 111, and is accompanied by an increase in the speed on the pulley 17. The pulley 112 is movable axially between limits afforded by wall 59 and a stop 121, extending vertically downward from the wall 58. To facilitate shifting of the pulley 112 from a position in which a 10-inch record may be played to a position in which a 12-inch record may be played, a spring 122 is coiled about the shaft 84 to which said spring is anchored at 123. The remaining end of the spring is fastened at 124 to a hub 119 on the pulley 112. Owing to this construction, the spring is placed under tension as the shaft 84 is extended to the right. Alternatively the spring is placed under compression as the shaft 84 is retracted so as to play 12-inch records. In this way, the pulley 112 is gently urged to change its position in which operation it is, of course assisted by rotation of the pulleys.

Electrical switch means are employed to govern, in part, the functions of the record changer and the sequence in which they become effective. This includes a rotary switch 125 (Fig. 3) which comprises an insulated rotor 126, slidably keyed to a shaft 127, within an aperture 128 of an insulation panel 129. The panel bears contacts 131, 132 and 133, adaptable of engagement with a blade 134, mounted on the insulator 126. The blade 134 is of curved conformation having a radial end portion 135 spaced from the remaining end 136, substantially more than the width of any of the brushes. The contact 133 is mounted sufficiently remote from the blade 134 to be engaged only by the radial end portion 135.

To operate the record changer, an operator rotates the blade 134 by rotating a handle 137 on the shaft 127. This makes a circuit between main power lines 139 and 141 by means of lead wire 142, contact 131, blade 134, contact 132, wire 143, motor 140, wires 144 and 154, switch 130 and wire 145. On becoming energized, the motor 140 drives the table 21 through a friction wheel and idler 138. By means of mechanism, to be described hereinafter, the wheel 105 also operates the tone arm and ejector mechanism. If the pulleys 17, 18, and 19 are in their extreme retracted positions at the time the switches 125 and 136 are actuated, the snap-switch 146 is open because of the position of the crank member 93. Member 93 is notched at 147 to provide radial switch-engaging surfaces 148 and 149 for opening or closing the switch 146 by engagement with a finger 150 carried on the switch arm. This is effected in accordance with a sequence of operation, the reason for which will be apparent hereinafter. As the pulleys 17, 18 and 19 are extended, they are accompanied by rotation of the plate 93 clockwise. This is followed by closing of the switch 146 thereby establishing a holding circuit between the leads 142 and 143 by means of connecting wires 151 and 152. Due to the switch circuit 146, the motor 140 is not stopped when rotor 126 is rotated back to the position indicated (Fig. 3). This enables operations, later to be described, to take place before the motor 140 is automatically stopped. Furthermore, the holding circuit provides a medium by which the motor 140 is operated to drive the turntable for playing records individually; that is, for playing records fed to the station $r$ manually, such as when it is desired to play a record of unusual size like a 4-inch or 6-inch diameter record.

For automatic operation, the rotor 126 is rotated (Fig. 3) from the position indicated to a position where a circuit is established between the end 135 and the contact 133, the contact 133 closing a circuit between wires 139 and 141 by way of leads 142, switch 125, leads 153 and 154, switch 130 and wire 145. This enables the motor 109a to rotate the record in station $r$.

Figure 8:
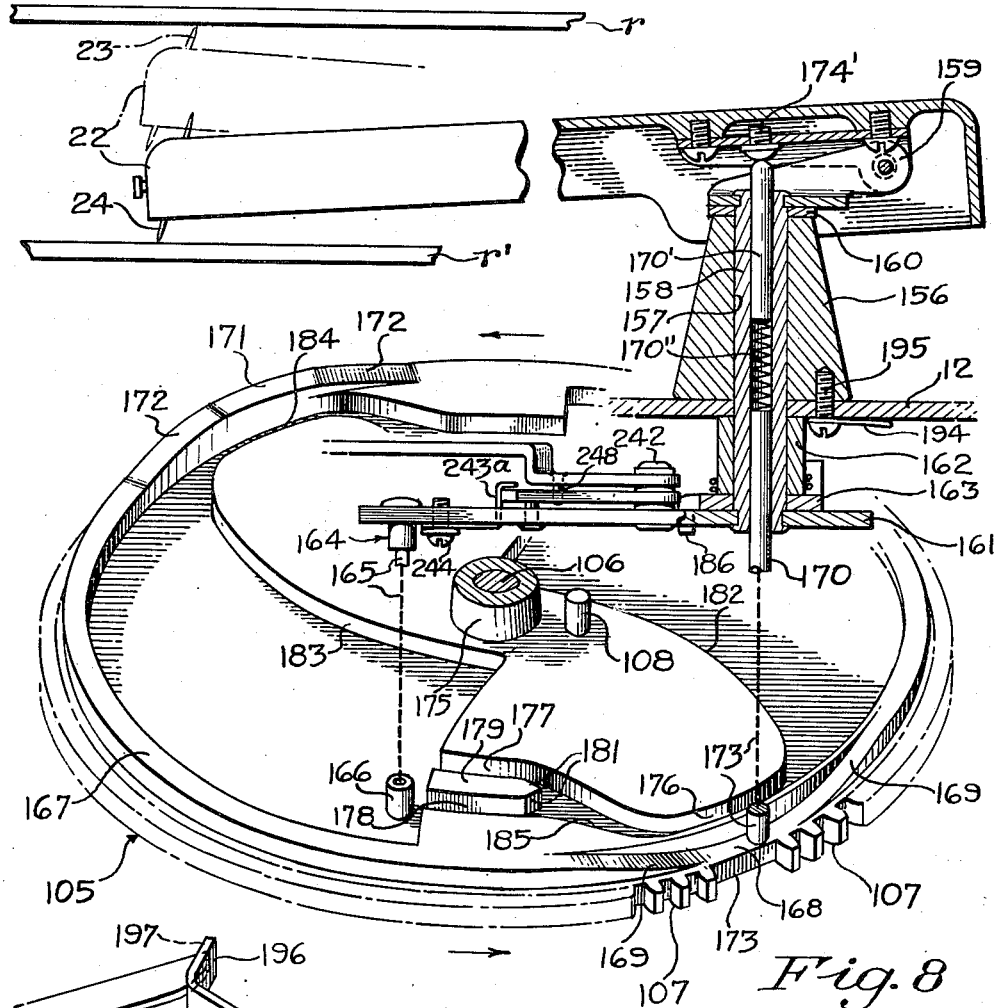
Fig. 8 is a diagrammatic view of the pickup means and operating cam, the pickup means being in vertical medial section and the control wheel in perspective.

Means for governing, in part, the operation of the pickup arm are shown in Fig. 8. The tone arm 22 is supported between the horizontal planes of the stations $r$ and $r'$, at the top of a column 156, which is bolted to the base 12. The column 156 is provided, axially thereof, with a bore 157, within which is journaled a sleeve 158. To the upper extremity of the sleeve is riveted a hinge 159 which, in turn, is bolted to the pickup arm 22. A bearing washer 160 on the sleeve spaces the hinge from the column. The sleeve 158 passes through the casing 12 and has riveted to the lower extremity thereof a cam arm 161. The sleeve also passes through a collar 162, which, together with rectangular-shaped plate 163, restrain the arm 161 from upward displacement. The free end of the arm 161 carries a downwardly-extending follower 164 comprising a stud 165, rigidly fastened to the arm, and a bearing sleeve 166, rotatably mounted on the stud. Provision is thus made for swinging the tone arm about the axis of the column 156 and across the surfaces of records in stations $r$ and $r'$; moreover, the hinge 159 enables the tone arm to rock vertically so as to operatively engage a record in either station $r$ or station $r'$.

In order that the tone arm may be rocked about the hinge 159 a cam track 167 is included on the upper surface of the cam wheel 105 toward the periphery thereof. The cam track is of uniform elevation throughout the major part of its circumference. However, at one side thereof the track is of an elevation lower than the remainder of the track thus providing a dwell 168. Inclined surfaces 169 on either side of the dwell extend upwardly to the remainder of the track. Diametrically opposite the dwell 168, the track includes an elevated dwell 171 having approaches 172 sloping downwardly therefrom. In rotating about its shaft 106 (counter-clockwise) the cam 167 rocks the arm 22 on its hinge 159. To derive this rocking motion from the cam lift rods 170 and 170' are employed. Rod 170 bears against cam 167 while rod 170' bears against an adjustment screw 174', carried by the pickup arm. The rods are slidably mounted in the sleeve 158 as is also a spring 170'', tending to push the rods apart. But the spring is strong enough to support the pickup arm at a level between the stations $r$ and $r'$, when rod 170 is in engagement with the cam track 167, thus providing clearance for the needles 23 and 24 when they are carried between records in the playing stations. When the rod 170 is in engagement with the dwell 168, however, the force of the spring only partly supports the weight of the arm thereby permitting a fraction of the weight of the pickup arm to provide engagement of needle 24 with a record being played. Continued rotation of wheel 105 moves the rod up the inclined surface 172 so that it may assume another position in which it engages the dwell 171. The needle 23 is thus raised into operative engagement with a record in station $r$.

The continuity of the series of gear teeth 107 is broken by recesses 173 and 174 (Fig. 6) adjacent the dwells 168 and 171. Therefore, the drive from pinion 32 to the wheel 105 is interrupted when the pinion reaches either of the recesses, but the wheel is again started on its course by mechanism to be described hereinafter, as soon as a record has been played on one side.

Additional cam means are provided to impart lateral motion to the tone arm. To this end the upper surface of the control wheel is recessed between the cam 167 and a hub 175. The recessed portion of the area between the dwell 168 and the hub 175 is identical with the area between the hub and the dwell 171. The duplicate recessed areas provide cam surfaces adapted to position the follower 164. The recessed area includes a narrow channel 176, adjacent the dwell 168, and of only sufficient width to accommodate the follower 164. The recessed area widens sufficiently to provide a channel 177 and a channel 178 on either side of a baffle 179. The baffle is provided with converging surfaces 181, to assist in guiding the follower 164 into one of the channels beside the baffle. After the lower side of a record has been played in the station $r$, the wheel 105 automatically starts rotating, counter-clockwise, the operation being prompted by mechanism later to be described. The wheel 105 having rotated sufficiently, the rod 170 rests on cam 167, adjacent the rise 172, where it supports the record playing free end of the pickup arm in a position between the horizontal planes of station $r$ and $r'$. At the same time that the follower 164 is guided away from a position adjacent the hub 175 by the curvilinear side of cam surface 182, thereby swinging the pickup arm out from between stations $r$ and $r'$. Then the follower 164 is guided into channel 176; thence into one of the channels 177 or 178, depending on the size of the record played. It will be noted that the channel 178 is nearer to the axis of the wheel than the channel 176. This construction is of such a nature that while the follower 164 is in channel 176, the pickup arm is beside the playing stations. In passing from a course defined by the channel 176 to a course governed by the channel 178, for example, the needle-bearing end of the tone arm is swung from a position beside the playing station to a point between the playing stations so that the needle 24 is disposed above the start of the playing groove of a record in station $r'$ adjacent the periphery thereof. By the time the follower 164 has advanced to a position slightly to the left (Fig. 8) of the channel 178, the rod 170 has passed down the incline 169, and has come to rest on the dwell 168. Simultaneously the pinion 32 ceases driving the gear because of interruption of the series of gear teeth by the recess 173. Also at the same time that the rod 170 descends the incline 169, the pickup arm is lowered into playing engagement with the record in station $r'$. The follower 164, with roller 166, then being temporarily free of the cam surfaces, moves with the pickup arm, the actual position of which is governed by the convolutions of the sound groove on the record. By the time the pickup arm reaches the runout groove on the record being played, follower 164 is adjacent a curvilinear cam surface 183, identical in contour with cam surface 182. Thereupon mechanism, later to be described, moves the wheel 105 slightly so that driving connection is restored between the teeth 107 and the pinion 32, with the result that the inclined portion 169 to the left of the dwell moves under the rod 170 which moves upwardly, raising the tone arm away from the record while the cam surface 183 bears against follower 164 thereby swinging the tone arm out from between the playing stations so that a record may be transferred from the station r to the station r'. At the end of this movement, the tone arm is positively held beside the playing station because of positive engagement of the follower 164 in a channel 184, identical with the channel 176. Since the cam surfaces which operate follower 164 are identical on either side of the hub 175, the pickup arm is swung underneath the edge of the record in station r as the incline 172 passes under the rod 170, while on the rise 171, the rod remains motionless due to the interruption by recess 174 of the drive from pinion 32. Mechanism, later to be explained, initiates engagement of the teeth 107 with the pinion thereby restoring rotation to wheel 105, after the record in station r has been played. This completes a cycle of operation.

The foregoing description indicates the course traveled through by the follower 164 when playing a 12-inch record. When a 10-inch record is about to be played, however, the pickup arm is not brought into engagement with a record until the pickup arm is swung laterally to a point nearer to the spindle than the channel 178 permits. Therefore, the channel 177 is provided, the pickup arm being lowered into engagement with a 10-inch record during passage of the follower through channel 177.

Means are provided to govern the selection of the channels 177 or 178 which the follower 164 is to pass through. Said means involve biasing the follower toward the axis of wheel 105 by applying spring pressure to the arm 161, or allowing the follower to take a course tending away from the axis which the follower takes when the effectiveness of the spring pressure is removed. Since the biasing force of the spring pressure urges the follower 164 toward the hub the follower passes through the channel 177 as the wheel 105 rotates. When, however, the spring pressure is relieved, the tendency of the follower is to continue in the course in which it was guided by the channel 176 from which it is forced to deviate by the outer wall of said channel as the same widens around either side of the baffle 179. Since the outer wall of channel 176, that is, the wall remote from the hub 175 includes an inwardly extending surface 185, the follower is guided into the channel 178.

Figure 9:
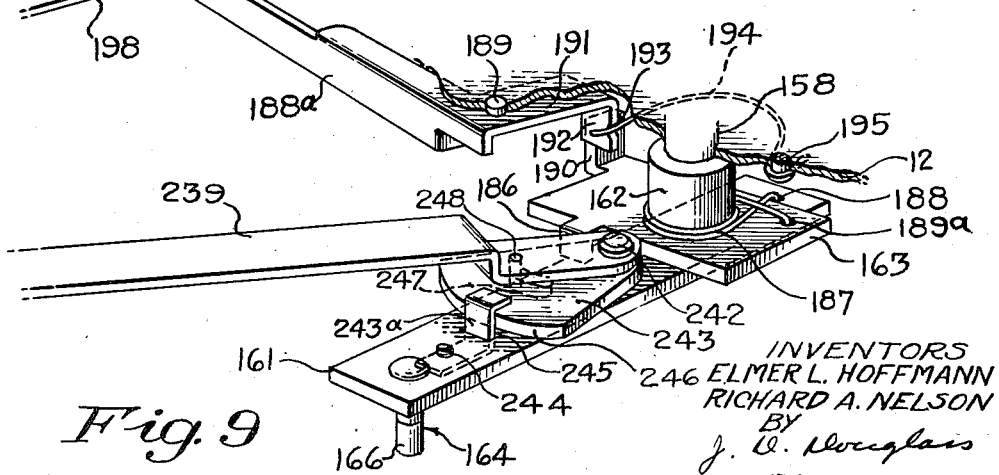
Fig. 9 is a fragmentary view, in perspective, showing the cam arm in addition to other parts that are coupled to the arm.

Mechanism for effecting these operations includes the plate 163 (Fig. 9) which is rotatably mounted on the sleeve 158 and which has a downwardly extending lug or stop 186, adapted to limit rotation of the plate about the sleeve. A spring 187, coiled about the collar 162, has one end thereof anchored to the arm 161 while the remaining end is anchored to the plate 163, the ends being preferably caught in holes 188 and 189a in the arm and plate respectively. The tendency of the spring to uncoil and rotate the plate 163 is resisted by the stop 186 so that the plate is normally supported transversely of the arm with the stop snugly bearing against the arm 161. Additionally, at one corner thereof, the plate bears an upwardly extending lug 190, cooperatively associated with a latch lever 188a. The latch lever is pivoted at 189 to the casing 12. Laterally thereof it includes an arm 191 terminating in a downwardly extending portion or stop 192. The stop is adapted to swing into the orbit of rotation of the lug 190 to limit, at times, the arc passed through by the follower 164. The stop 192 is notched at 193 to receive one end of an arcuate spring 194 which is anchored to the casing 12 by a screw 195. The spring 194, by a tendency to straighten, pushes against the stop to rock it counter-clockwise about its pivotal support 189. The lever 188a further includes a tail-portion 196 which is bent laterally to provide a contact surface 197. The turning motion of the lever 188a is arrested by a lever 198 (Fig. 10), pivoted at 199 to the portion of the casing 25. At one end thereof the lever 198 is of arcuate conformation to provide a cam surface 201 for sliding, pressure-resisting association with the contact surface 197. The lever 198 is adaptable of being rocked about its pivot 199 by a cam 202, pinned to the sleeve 62 (Figs. 10 and 11). Contact of the lever with cam 202 is normally maintained by the force of a tension spring 203, anchored to a shaft 204. Force of the spring is communicated to the lever 198 by a lever 205 and a link 206.

There is a relationship between the position of the ejector head 16 and the positions between the playing stations from which the pickup arm may be rotated into initial engagement with either a 10-inch or a 12-inch record. Whether the pickup arm is moved from a point beside the playing stations to a position adjacent the edge of a 12-inch record or from the point beside the playing stations to a point adjacent the edge of a 10-inch record before the pickup arm is rotated into initial playing engagement with a record of either size is governed by the position to which the ejector head is manually turned. In the position indicated (Figs. 1–6, 8–11 inclusive) the record changer is adjusted to play a 10-inch record. In this position the stop 192 is on the radius of the orbit passed through by the lug 190. Consequently the rotation of the plate 163 is limited in its rotation about the axis of the sleeve 158. Owing to this arrangement, in a cycle of operation, the follower 164 follows, for example, the cam surface 182 as the wheel 105 rotates. When the follower is at a radial distance from the center of the wheel approximately equal to the radial distance between the axis of the wheel and the channel 177 the lug 190 strikes the stop 192. During the remainder of the distance to the arc of the channel 176, the cam surface moves the follower 164 against the resistance of the spring 187, the arm 161 then moving away from lug 186. Since during this part of its course the follower is therefore biased toward the axis of the wheel, the follower is held in contact with the inner side of the channel 176 as it widens toward the respective channels 177 and 178. Therefore, the follower passes through the channel 177, beyond the left end of which the needle 24 has been lowered to the run in groove of a record, or raised so that the run-in groove of the record in station r is engaged by needle 23 as would be the condition during engagement by the follower with the corresponding cam surface on the diametrically opposite side of wheel 105.

In order to play a 12-inch record, the ejector head 16 is lifted against the force of a compression spring 208 (Fig. 11) about the sleeve 62 and between the casing 12 and cam 202, the head 16 is rotated through a half turn and then lowered in such a way that the pin 75 enters the hole 76. In this operation the cam 202 is also rotated so that the high region thereof rocks the lever 198 (Fig. 10) against the force of spring 203. Simultaneously the lever 188a is rocked about its pivotal point until the stop 192 (Fig. 9) passes completely within the arc swung through by the lug 190 so that the stop does not interfere with the rotation of lug 190. Not, therefore, being biased toward the axis of the wheel on emerging from the channel 176, the follower is guided toward the center of the wheel only by the outer wall of the channel 185. The follower, therefore, passes through the channel 178 whereupon the pickup arm is effectively brought into playing engagement with the run in groove of a 12-inch record in the station r', or with a record in station r if the follower is in engagement with the opposite side of the wheel 105.

Mechanism for removing an unplayed record from the stack R is operated from the wheel 105 (Figs. 10 and 11). The mechanism for performing this operation includes a link 211, coupled at one end thereof to the shaft 66 by a crank 212. The crank is rigidly mounted on the shaft and is loosely coupled to the link by a crank pin 213. The remaining end of the link 211 terminates in an upwardly extending lug 214, adaptable of engagement by a stud 215 on the lower side of the wheel 105. The link 211 is slidably anchored to the arm 34 which has therein a slot 216 through which passes a screw 217 having an extremity 218 of reduced diameter, threaded in the link 211. The link is normally drawn to the right as shown by a tension spring 219 which at one end thereof is anchored to the extremity of the arm 34, the end of the spring being hooked in a hole 220 in the arm. The remaining end of the spring is hooked under the head of the screw 217 and is separated from the arm 34 by a washer 221. When, therefore, rotation of the wheel 105 takes place the stud 215 on engagement with the lug 214 pushes the link 211 to the left against the resistance of the spring 219, sufficiently to rock the crank 212 through approximately a half turn, thereby also swinging the cam 65 through a half turn which is accompanied by movement of the fingers 55 and 56 to dislodge the bottommost record from the stack R. The link 211 is thus operated immediately after a record is transferred from station r to station r'.

After one side of a record has been played it is "rejected"; that is, the record is discarded. When one side of the record is thus rejected the record is moved on to the next station where the remaining side may be played, or a different unplayed record may replace the rejected record. A record may also be rejected at any time during the operation of playing it. The record can even be rejected when it is about to be played. This is effected by starting the cam wheel 105 since the record is played only when one of the blank spaces 173 or 174 is at the pinion 34.

Provision is made for automatically engaging the cam wheel 105 with the pinion 32 when the pinion is disposed in either of the blank spaces 173 or 174. This involves use of a lugged wheel 221a (Figs. 12-15) keyed to and rotatable with the sleeve 31. It also involves dogs 222a and 223, pivoted to the wheel 105 on opposite undersides thereof at 224 and 225. The free ends of the dogs are urged outwardly of the wheel 105 and under the spaces 173 and 174 by springs 226, coiled about their pivotal points and having the ends thereof anchored to the dogs and the wheel 105. In their outward motion, the dogs are limited by stop pins 227a on the wheel 105. The free ends of the dogs are adaptable of being engaged by lugs 228 on the wheel 221a and to consequently convey the rotary thrust of the lugs to the wheel 105. Each of the dogs is positioned in such a relationship with the spaces 173 and 174 that the dogs are adapted to immediately engage the lugged wheel once the pinion 32 enters one of the spaces 173 or 174.

The dogs are normally held inoperative by a guard operating in conjunction with the lugged wheel 221a to hold the dogs in contact therewith, except when a change of cycle is desired.

The free extremities of the dogs are provided with pins 226a and 227, extending laterally of the dogs. The pin 226a on dog 223 is substantially shorter than pin 227 on dog 222a. The pins are adaptable of engagement by an arm 230 extending laterally of a rock-shaft 229 which is slidable axially on its bearings. Coiled about the shaft 229 between the arm 230 and bracket 34 is a compression spring 231 which forces the shaft and arm upwardly, this movement being limited by a collar 232, pinned to the shaft below the bracket 34. The arm 230 is provided with a laterally extending finger 233 adapted to normally occupy a stop position between the lugged wheel 221a and either of the pins 226a or 227. The arm 230 is normally maintained in a stop position by a spring 234, coiled about the shaft 229 and having its lower end anchored to the casing 25. The upper extremity of the spring 234 presses against an arm 235, extending laterally of the shaft 229. The arm 235 is adapted to swing within the limits of stops 236 and 237 extending vertically of a yoke 238, rigidly mounted on the casing 25. The spring 234, therefore, biases the arm 235 against the stop 237 in which biased position the arm 230 occupies the position indicated in Fig. 12, the pawls therefore being precluded from engagement with the wheel 221a.

The shaft 229 is adaptable of being rocked by the control wheel 105, the arm 161 (Figs. 17 and 18) conveying cam motion therefrom. Additionally, a floating arm 239 and a mobile lever 241 are employed as links to convey the swinging motion of arm 161 as will be noted in Figs. 18-21 inclusive. The floating arm 239 is pivoted to the cam arm at 242. Between the respective arms a friction segment 243 (Figs. 8 and 9) is sandwiched, and adapted to swing about the pivot 242. In its capacity to swing, the segment is resisted by a leaf spring 243a, conveniently attached to the lower side of the arm 161 as by a screw 244. The spring is bent laterally to extend upwardly through an aperture 245 in the arm 161 so that the spring may apply pressure to a surface 246 circumferentially of the pivot 242. In addition to the foregoing connections the arm 239 is connected to the friction segment by lost motion coupling including a slot 247, circumferentially of the pivot 242, and a pin 248, extending downwardly from the arm 239 into the slot. This enables the arm 239 to swing, within limits afforded by extremities of the slot 247, relative to the friction segment 243. The mobile lever 241 is pivoted at 249 to the extremity of arm 239 (Figs.

17 and 18) and carries at one end thereof an upwardly extending follower 251, which preferably has a resilient periphery as occasioned by use of a rubber collar in the structure of the follower. Laterally of its remaining end, the lever 241 is provided with an upwardly-turned flange 252, adaptable of engagement with the free end of the lever 235. The follower 251 is adaptable of being engaged by a rotating lug 253 extending radially of the washer 44 on the spindle 31 and terminating in a downwardly extending free end-portion. The mobile lever 241 is biased about its pivot 249 clockwise (Fig. 18) by a tension spring 254. A lug 255, extending outwardly and downwardly from the side of lever 241, abuts the arm 239 and thus limits rotation of the lever 241.

After the pickup arm initially contacts a record in one of the playing stations, it is carried toward the spindle by the record itself. The cam arm 161 is simultaneously carried through the arc traversed by the pickup arm and in its course carries with it the arm 239 and mobile lever 241 from the position indicated in Fig. 18 to the position indicated in Fig. 19. At this stage the follower 251 is then engaged by the rotating lug 253 which rocks the mobile lever 241 about its pivot 249 against the resistance of spring 254 (Fig. 17). In this operation the flange 252 presses against the arm 235 and swings it from the Fig. 19 position to the Fig. 20 position. As the arm 235 is thus rocked, the arm 230 is simultaneously rocked from the Fig. 12 position to the position indicated in Fig. 14. One of the dogs is permitted to engage the lugged wheel 221a and start the cam wheel 105, thereby rejecting the record just played.

Provision is made to cause quick engagement of the follower 251 with the lug 253. This is necessary because of the very gradual approach that the follower has to the lug 253 during the operation of playing a record. As the convolutions of the sound groove on a record cause the follower 251 to initially engage the lug 253 there is, for a short period, a condition of frictional contact between the follower and detent during which time the lug strikes the follower tangentially and merely pushes the follower away from it. During this period, the cam arm 161 is swung by the tone arm toward the axis of the record and the pin 248 is first gradually swung from the left hand end of the slot 247, as will be noted in Fig. 18, to the right hand end of the slot as indicated in Fig. 19. The arm 161 is swung nearer to the axis of the record, together with the segment 243. Immediately, however, when the needle of the pickup arm reaches the runout groove, the follower 251 is carried suddenly toward the axis of the turntable. Accompanying this motion, the axis of the follower at least passes to the orbit passed through by the lug 253. This enables the lug to carry the follower ahead of it and to swing the mobile lever about its pivot 249, until the follower is outside the orbit of the lug. During its engagement with the lug, the lug carries the follower with it, and in so doing, may draw the arm 239 suddenly and violently toward the axis of the turntable. This operation would be detrimental to the connection between pickup arm and record, were it not for the lost motion coupling between the arm 239 and friction plate 243. Under the circumstances the arm 239 merely swings inwardly as permitted by the lost motion provided by pin 248 and slot 247. The lost motion connection is also of value on disengagement of the follower from the lug since the resiliency of the follower's surface, together with the force of the spring 254, would otherwise tend to dislodge the pickup arm from operative engagement with the record being played and possibly give rise to scratching of a record's surface.

When the arm 235 is rotated by the flange 252, the shaft 229 is rotated, withdrawing the finger 233 from the pin 227. This allows the dog 222a to be swung, by the spring 226, into operative position for engagement by one of the lugs 228. The cam wheel 105 is thereby sufficiently rotated so that its teeth 107 mesh with the pinion 32, as previously described.

Anti-rejection mechanism is provided to prevent records from being automatically rejected when they have been played. It is to enable a record to be replayed, in part or in its entirety, by operatively associating or disassociating the pickup arm with the record, manually. The mechanism also provides for playing odd sized records, assisted by other mechanism to be referred to and described hereinafter. The anti-rejection mechanism includes means for rocking the lever 198 from the Fig. 10 position to the Fig. 21 position in which a flange 255, extending upwardly from the lever at one side thereof, contacts the arm 235. In this position the mobile lever 241 contacts the flange 255 while a record is being played. Since the follower 251 is thus precluded from engagement by the lug 253, the pinion 32 remains in one of the blank spaces 173 or 174 of the cam wheel 105, the finger 233 (Fig. 12) preventing the cam wheel from receiving a starting impulse from lugged wheel 221a through one of the dogs. Remote from the axis of the pinion 32 and on the shaft 127 (Figs. 13 and 17) is rigidly mounted a cam 256 having at one side thereof a lug 257, extending substantially parallel with its supporting shaft. The shaft 127 is slidably mounted relative to the switch 125, being adaptable of movement through the rotary member 126 (Fig. 3) without axially disturbing said rotary member. Additionally the cam 256 (Fig. 13) is normally held adjacent the casing 12 by a compression spring 258, around shaft 127 and between cam 256 and switch 125. Owing to this construction, movement of the handle 137 toward the switch also moves the lug 257. In all the possible positions thereof the lugs is adaptable of engagement with the extremity of the lever 205, rotatable about a rigid pivotal support 259, so that motion of the lever 205 is adapted to be communicated to the lever 198 by link 206. The shaft 127 is rocked against frictional resistance conveniently included in the switch 125, the purpose of the resistance being to prevent the spring 203 from rotating the cam 256 from any one of the positions in which it has been set after the handle 137 has been released.

Means are provided for rejecting a record at any time during playing of the same. This involves mechanism for removing the support of the finger 233 (Fig. 14) whereupon engagement by one of the dogs 222a or 223 with the lugged wheel 221a takes place. By sliding the rock-shaft 229 through its bearings in a downward direction, disengagement of the finger 233 from either pin 226 or 227 is effected, thereby enabling one of the dogs to snap into engagement with the lugged wheel 221a and permit the lugged wheel to restore rotation to the cam wheel 105. In order to vary the axial position of the shaft 229, the control shaft 204 is employed. The control shaft is journaled in brackets 261, 262 and 263 and terminates in a cam-engaging end portion 264 (Fig. 13), extending laterally of the shaft. At the opposite end thereof the shaft 204 includes a laterally extending actuator arm 265, adaptable of engagement with the arm 230 (Fig. 16). Between the brackets 262 and 263 the shaft 204 is offset at 266 to provide a crank portion. A tension spring 267, attached to the crank portion and anchored to the casing 25, normally holds the shaft in an inactive position in which the arm 265 exerts no pressure on the arm 230. From this position it may be rocked by the cam 256. Additionally, the cam 256 is provided with a step 268, while another step 269 is farther from the casing 12 than the step 268. Normally the spring 258 maintains the cam surfaces 268 and 269 in spaced relationship with the arm 264 of shaft 204. While the shaft 204 is in its inactive position; that is, before the spring 258 is depressed, the finger 233 (Fig. 12) is adapted to engage whichever of the pins 226 or 227 that approaches the finger. When, however, the handle 137 is grasped and depressed to an extent limited by the casing 12, the step 268 on cam 256 presses the arm 264 downwardly thus rocking shaft 204 and at the same time depressing the shaft 229 and arm 230 against the resistance of spring 231. This initial motion of the knob 137 is sufficient to lower the finger 233 so that it no longer acts as a stop for the shorter pin 226. Therefore, the dog 223 snaps into engagement with the lugged wheel 221a and the cam wheel 105 starts rotating, the pickup arm thereupon being removed from engagement with the record just played. The cam step 268 therefore serves the purpose of rejecting a record in playing station r. If, now, while the knob 137 remains depressed, sufficient rotary motion is imparted thereto to bring the cam step 269 into operative engagement with the arm 264, the shaft 204 is additionally rocked and the arm 230 additionally depressed. The additional lowering of the arm 230 is sufficient to provide clearance between said arm and the pin 227 thereby enabling the dog 222a to snap into engagement with the lugged wheel 221a. In this way, a record in station r' may be rejected.

Other combinations of record manipulation can be effected by the foregoing controls. For example, the arm 230 may be depressed only enough to cause the short pin 226 to pass over the top of the arm and the pin 227 to be engaged by finger 233 which would be followed by a record being rejected in station r and played in station r'. This would involve rejecting the lower side of the record and playing the upper side only.

Additionally, the cam step 269 may reject a record on the playing of one side or a portion thereof after the arm 241 has delayed the rejection as in Fig. 21, since the step 269 causes sufficient lowering of the finger 233 to withdraw the same from engagement with either of the pins 226 or 227.

Provision is made for playing records of odd construction such as records without run-in and run-out grooves, besides records of unusual diameters. These records may be played in station r' only, where they are positioned and from which station they are removed, manually. In addition, the pickup arm is operatively associated and disassociated with the records manually. Before both sides of one of the records can be played, it must be inverted and this operation is also performed manually. Mechanism is therefore provided to releasably hold the pulleys 17, 18 and 19 in their extreme outward positions in order that the foregoing manual operations may be most conveniently carried out. The mechanism involves use of a latch arm 271 (Fig. 16), of U-shaped conformation. The arm 271 is rotatably mounted on the shaft 204 between the brackets 262 and 263 (Figs. 10 and 13). One of the extremities 272 of the arm extends substantially from the shaft 204 and terminates in a laterally extending stop 273. The stop is, in turn, adaptable of engagement with a lug 274, downwardly extending from the link 98. A tension spring 275 is anchored at one end thereof to the latch arm while the remaining end of the spring is connected to the arm 265 toward the free extremity thereof, in any convenient manner such as by a clamping band 276. Owing to this construction, the latch arm extremity 272 is biased by the spring 275 in a position, substantially in line with the arm 265. By this construction the stop 273 is normally in spaced relationship with the link 98; that is, when the shaft 229 is in the Fig. 13 position in which the lug 274 may pass over the stop 273. When, however, it is desired to manually apply a record to the turntable and to manually remove the same therefrom, the crank member 93 is rotated from the Fig. 6 position to the position indicated in Fig. 7 in which the lug 274 is to the right of the stop 273 (Fig. 16). The shaft 204 is then rocked so that the arm 265 is pressed downwardly against the spring 231 and is accompanied by an upward swing of the stop 273, against the link 98. Then the link 98 is allowed to start return to the Fig. 6 position by spring 102 (Fig. 5). But the stop 273 engages the lug 274 and prevents further right-to-left movement (Fig. 16) of the link 98. By its urge to return leftward the lug 274 holds the latch arm in locked engagement therewith even though pressure by the arm 265 on arm 229 is relieved. The pulleys 17, 18 and 19 are thus held in outwardly retracted position.

From the position of locked engagement with the latch arm 271, the lug 274 may be disengaged by moving the link 98 slightly to the right whereupon the spring 275 pulls the arm 272 away from the lug. This may be effected by lifting and turning the ejector head slightly.

Having thus described the invention, it will be apparent to those versed in the art that many minor changes and deviations from the exact construction shown, can be made without departing from the spirit or scope of the invention.

I claim:

1. An automatic record player comprising mechanism to support a record in first and second playing stations and record dispensing means for supplying records to either of the stations in addition to a single pickup means for alternately engaging a record in either of the stations, means connected to said pickup means to move it to engage the beginning of the sound groove of records of more than one size in either of said stations, the first of said stations including a plurality of removable rotary supports for supporting a record in one of said stations, radially extending guides for said supports, said supports being connected to the guides and limited by the guides in their course of movement by the guides, motive means to drive one of said supports, a rotary crank member, movable links to connect the supports to the crank member, spring means to rotate the crank member and extend the supports to record-sustaining position, cam means connected to the crank member to rotate the crank member against the force of said spring and remove the supports from record-sustaining position to effect the transfer of a record from the first to the second station and latch means adapted to retain the supports in inoperative position.

2. An automatic record player comprising means to support a record in first and second playing stations and magazine means in spaced relationship to said stations, said magazine having means including a shouldered spindle centrally of said stations to support records at their center holes, and means including an ejector head laterally of said stations to support and cyclically release a record from said magazine to one of said stations, and motive means to provide for rotation of a record in opposite directions in the respective stations, a pickup arm adaptable for intermittent association with either of the stations by means of mechanism comprising, a cam wheel below the stations, said wheel having a lateral motion cam thereon connected to the tone arm to vary the position of the tone arm in a horizontal plane, said wheel also including a vertical motion cam connected to the tone arm to provide for rocking of the tone arm from said horizontal plane to either of the stations, separate series of gear teeth at the periphery of the cam wheel formed to provide blank spaces between said series, a driven pinion arranged for engagement with either series of gear teeth, a lugged wheel driven with the pinion, at least one dog pivoted to the cam wheel and adapted to engage the lugged wheel, spring means connected to the dog to normally bias the dog to lugged wheel-engaging position, said wheel being adapted to normally push the dog and cam wheel past either of the blank spaces to provide meshing engagement of said piston with said cam gear, and automatically-operated latch means for swinging the dog away from lugged wheel-engaging position.

3. An automatic record player comprising means to support a record in first and second playing stations and a stationary record dispensing magazine spaced from both of the stations to supply records to either of the stations in addition to a single pickup arm adaptable of intermittent association with either of the stations, motive means to drive a record in one of the stations, motive means to drive a record in the second of said stations, a cam wheel below the stations, said wheel having a lateral motion cam thereon to vary the position of the pickup arm in a horizontal plane between the stations, said wheel also having a vertical motion cam to rock the pickup arm from said horizontal plane into cooperative association with either of the stations, separate series of gear teeth at the periphery of the cam wheel having blank spaces between said series of gear teeth, a driven pinion adaptable of engagement with either of the series of gear teeth, a lugged wheel driven with the pinion, at least one dog pivoted to the cam wheel and adapted to engage the lugged wheel, spring means to normally bias the dog to lugged wheel-engaging position, said lugged wheel being adapted to push the dog and cam wheel past either of the blank spaces, and into driving association with said pinion, automatically operated latch means for swinging the dog away from lugged wheel-engaging position and manual means adapted to render the latch means inoperative.

4. An automatic record player comprising means for supporting a record in first and second playing stations, said means including a turntable for one of the stations and fixed record dispensing means in spaced relationship to said stations to supply records to either of the stations, motive means to provide for rotation of a record in the first of the stations, motive means to provide for rotation of a record in the second of the stations in a direction opposite to the direction of rotation in said first station, a single pickup arm adaptable of intermittent association with either station by means comprising, a cam wheel below the stations connected to the pickup arm to govern the position of said pickup arm from the termination of reproduction of one record to the point of initial engagement of said pickup arm with another record, said cam wheel including means thereon from which said pickup arm is adapted to be rocked vertically, said cam wheel also including means thereon from which said pickup arm is adapted to be swung laterally, means including a shaft to carry said pickup arm, a cam arm extending laterally of said shaft and adapted to be swung about the axis of said shaft by said cam wheel, said shaft being adapted to rotatably couple said arm to said pickup arm, separate series of gear teeth on said control wheel, the ends of each of said series terminating to provide blank spaces therebetween, a pinion drivingly associated with said turntable support, one of said blank spaces on the cam gear normally being adapted to occupy a position adjacent said pinion, means adapted to drivingly associate one of said sets of gear teeth with said pinion at the termination of reproduction of a record, comprising a lugged wheel drivingly associated with said pinion, at least one dog pivoted to the cam wheel and adapted to engage the lugged wheel, spring means to normally bias said dog to lugged wheel-engaging position, said cam wheel being thereby adapted to receive an increment of motion to provide engagement of said pinion with one of said sets of teeth, latch means for normally holding the dog out of lugged wheel-engaging position during reproduction of a record, trip means in association with said dog to unlatch said latch means at the termination of reproduction of a record comprising, a floating arm pivoted to said cam arm, means including a friction member between said cam arm and said floating arm to operatively provide for movement of said floating arm with respect to said rotary lug, and a mobile lever pivoted to said floating arm and adapted to be rocked by said rotary lug when the pickup arm reaches the end of the sound groove of a record, said latch being adapted to be engaged by rocking of said mobile lever and to thereby release said dog for providing driving relationship between said pinion and said cam wheel.

5. A device for automatically playing consecutively the two sides of each of a group of phonograph records by mechanism comprising, a base plate, a driven turntable mounted on said base plate, a plurality of rotatable record support elements in association with and spaced from said turntable, said elements collectively adapted to support a record in a first playing station, said turntable supporting a record in a second playing station, means including bearer members to support said support elements from said base plate, one of said support elements being driven, guide elements radially of the axis of said turntable and in communication with said base plate to slidably anchor said bearer members to said base plate, means including a shouldered spindle to support a supply of records at their center holes, and an ejector head to support said supply of records at their peripheral edges to provide a magazine for the records in spaced relationship to the playing stations, said ejector head and said spindle being supported from said base plate, link means connected to said bearer members for moving them radially to remove said rotatable record support elements from the support of a record to release of a record from the first playing station to said second playing station, a single pickup means adapted to operably engage and track a record in either of said stations, cyclically operable mechanism adapted to be operated in response to engagement of said pickup means by the terminal groove of a record in either of said stations, means by which said pickup arm is adapted to be swung out from between said stations by operation of said cyclically operable mechanism, and means connecting to said ejector head is for actuating the same cyclically to release a record from said magazine thereby providing for transfer of a record to said first playing station when said pickup means is swung outwardly.

6. A phonograph record changer, comprising a base, a turntable rotatably supported on the base and constituting a record playing station, a plurality of supports disposed on said base beyond the periphery of the turntable and guide means for said supports to guide the supports in their movement radially toward the center of the turntable, means to rotatably support a record above the turntable including a plurality of wheels on said supports for tangential engagement with the underside of a record and constituting a first record playing station, said supports being movable outwardly from supporting engagement with the records to drop the record to the turntable, drive means connected to the turntable to rotate the turntable for the playing of a record, a second drive means for at least one of said wheels in the first station including a support, a motor rockably carried by the support, a shaft for said motor, a slidable shaft for supporting one of said record supporting wheels, a friction wheel carried by said slidable shaft and disposed in driving engagement with said motor shaft.

7. A phonograph record changer, comprising a base, a turntable rotatably supported on the base and constituting a record playing station, a plurality of supports disposed on said base and guide means for said supports to guide the supports in their movement radially toward and from the center of the turntable, means to rotatably support a record above the turntable including a plurality of wheels on said supports for tangential engagement with the underside of a record and constituting a first record playing station, said supports being movable outwardly from supporting engagement with the record to drop the record to the turntable drive means connected to the turntable to rotate the turntable for the playing of a record, a second drive means for at least one of said wheels in the first station including a support, a motor rockably carried by the support, a shaft for said motor, a slidable shaft for supporting one of said record supporting wheels, a friction wheel carried by said slidable shaft and disposed in driving engagement with said motor shaft, said motor shaft being formed with sections of different diameter and means connected to said slidable shaft to selectively move the wheel into engagement with the different sections of said motor shaft.

8. A phonograph record changer including a base, a turntable rotatably supported on said base, drive means connected to the turntable for rotating the same, a stationary spindle supported by the base and extending upward from the center of the turntable and being formed at its upper extremity to support a stack of records at their center holes, means for supporting the records at their edges comprising a record support, ejector means on said record support for engagement with the edge of the bottommost record of a stack to release a record from its supports, means for supporting and rotating a record disposed in spaced relation above the turntable and constituting a first record playing station, said supporting means including a pair of supports slidably connected to said base, rubber rimmed wheels carried by said supports with their axis on a horizontal plane, a third support for the record in said first playing station including a shaft, a third rubber rimmed wheel carried by the shaft, and means to slidably support the shaft for longitudinal movement, a motor for effecting the driving of the record in the first station rockably supported below said shaft, a shaft on said motor, a friction wheel carried by said record station wheel shaft and engaged with said motor shaft, a pair of links connected to said first supports for said wheels in the first record playing station, a lever having one end connected to said drive shaft for the wheel in the first record playing station and pivoted intermediate its ends to a fixed pivot, a third link connected to the other end of the lever, a rotatable member connected to the ends of said links and operable upon rotational movement to move the supports and their rubber rimmed wheels and the drive wheel radially outward for releasing a record supported thereon and dropping the record to the turntable.

9. A phonograph record changer including a base, a turntable rotatably supported on said base, motor drive means connected to the turntable for rotating the same, a stationary spindle supported by the base and extending upward from the center of the turntable and being formed at its upper extremity to support a stack of records at their center holes, means for supporting the records at their edges comprising a record support, ejector means on said record support for engagement with the edge of the bottommost record of a stack to release a record from its supports, means for supporting and rotating a record disposed in spaced relation above the turntable and constituting a first record playing station, said supporting means including a pair of supports slidably connected to said base, rubber rimmed wheels carried by said supports with their axis on a horizontal plane, a third support for the record in said first playing station including a shaft, a third rubber rimmed wheel carried by the shaft, and means to slidably support the shaft for longitudinal movement, a motor for effecting the driving of the record in the first station rockably supported below said shaft, a shaft on said motor, a friction wheel carried by said record station wheel shaft and engaged with said motor shaft, a pair of links connected to said first supports for said wheels in the first record playing station, a lever having one end connected to said drive shaft for the wheel in the first record playing station and pivoted intermediate its ends to a fixed pivot, a third link connected to the other end of the lever, a rotatable member connected to the ends of said links and operable upon rotational movement to move the supports and their rubber rimmed wheels and the drive wheel radially outward for releasing a record supported thereon and dropping the record to the turntable, and means cooperating with said rotatable member to adjust it to an intermediate position for supporting records of different diameters, said motor shaft having a reduced portion and an enlarged portion selectively cooperable with said friction wheel to change the speed of said wheel when in engagement with the different portions.

ELMER L. HOFFMANN.
RICHARD A. NELSON.

References Cited in the file of this patent

UNITED STATES PATENTS

| Number | Name | Date |
|---|---|---|
| 2,318,654 | Wissner | May 11, 1943 |
| 2,352,331 | Leline | June 27, 1944 |
| 2,438,264 | Bender | Mar. 23, 1948 |
| 2,457,668 | Hart | Dec. 28, 1948 |
| 2,488,137 | Morrison | Nov. 15, 1949 |
| 2,515,283 | Wissner | July 18, 1950 |

FOREIGN PATENTS

| Number | Country | Date |
|---|---|---|
| 822,026 | France | Sept. 6, 1937 |
| 541,156 | Great Britain | Nov. 14, 1941 |
| 111,950 | Sweden | Sept. 26, 1944 |